United States Patent
Minagawa

[11] Patent Number: 5,586,151
[45] Date of Patent: Dec. 17, 1996

[54] TRANSMISSION RATE CONTROL SYSTEM FOR INFORMATION PROCESSING SYSTEM

[75] Inventor: Akitaka Minagawa, Kawasaki, Japan

[73] Assignee: Fujitsu Limited, Kawasaki, Japan

[21] Appl. No.: 850,902

[22] Filed: Mar. 13, 1992

[30] Foreign Application Priority Data

Mar. 18, 1991 [JP] Japan ................................. 3-051835

[51] Int. Cl.$^6$ ............................................. H04L 23/00
[52] U.S. Cl. ........................... 375/377; 375/222; 370/468
[58] Field of Search ..................... 375/8, 121; 370/84; 340/825.06, 825.14; 307/269

[56] References Cited

U.S. PATENT DOCUMENTS

| | | | |
|---|---|---|---|
| 4,001,504 | 1/1977 | Hendrickson | 375/121 |
| 4,236,248 | 11/1980 | Teramura et al. | 375/121 |
| 4,761,800 | 8/1988 | Leje et al. | 375/121 |
| 4,780,883 | 10/1988 | O'Connor et al. | 375/121 |
| 4,847,867 | 7/1989 | Nasu et al. | 375/36 |
| 4,931,250 | 6/1990 | Greszczuk | 375/8 |
| 5,099,141 | 3/1992 | Utsunmiya | 327/298 |
| 5,122,677 | 6/1992 | Sato | 307/269 |
| 5,274,678 | 12/1993 | Feroluto et al. | 375/108 |

*Primary Examiner*—Stephen Chin
*Assistant Examiner*—T. Ghebretinsae
*Attorney, Agent, or Firm*—Staas & Halsey

[57] ABSTRACT

A transmission rate control system is adapted for an information processing system which exchanges data between a host unit and at least one terminal equipment via a first transmission line. The transmission rate control system includes a first part provided in the host unit for generating a clock switching signal which instructs a switching of a first clock signal which determines an operation of the terminal equipment, a second part provided in the terminal equipment for generating the first clock signal which determines the operation of the terminal equipment, a third part provided in the terminal equipment for switching a period of the first clock signal generated from the second part in response to the clock switching signal received from the main unit, so that a transmission rate of the terminal equipment is switched, and a second transmission line provided exclusively for transmitting the clock switching signal from the host unit to the terminal equipment.

24 Claims, 12 Drawing Sheets

TRANSMISSION RATE CONTROL SYSTEM FOR INFORMATION PROCESSING SYSTEM

BACKGROUND OF THE INVENTION

The present invention generally relates to transmission rate control systems, and more particularly to a transmission rate control system for an information processing system which exchanges data via a serial interface.

Recently, terminal equipment which is coupled to a personal computer or the like is controlled by data transmitted via a serial interface, so as to simplify the construction of the equipment and to simplify the control procedure.

A host unit which is coupled to such terminal equipment is provided with a number of serial interfaces corresponding to the number of terminal equipment coupled thereto. Hence, the host unit must simultaneously control the terminal equipment. On the other hand, in order to carry out the data processing within a short time, it is desirable that the transmission rate between the equipment be high.

There is a limit to the data processing speed within the host unit. For this reason, there is a possibility that data processing will become impossible if the transmission rate becomes too high.

For the sake of convenience, a case will be considered where the transmission rate is 10,000 bps and the start-stop transmission system is employed. If one byte of data is made up of a total of 10 bits, including 8 bits of unit data and 1 bit each of start and stop bits, it takes $\frac{1}{1,000}$ second to transmit the data amounting to one byte.

When the transmission data is transferred continuously, the host unit must process the data within $\frac{1}{1,000}$ second from the receipt thereof because the data will otherwise be overwritten and erased by the next transmission data. If the data is erased, it no longer becomes possible to carry out normal data processing.

In addition, if there are 10 lines and 10 serial interfaces provided, the time in which the above data processing must take place becomes $\frac{1}{10}$ of the above described $\frac{1}{10,000}$ second.

Therefore, the transmission time between the host unit and the terminal equipment must be set depending on the performance of the host unit and the amount of data which is transmitted.

FIG. 1 shows an example of a conventional method of setting the transmission rate for each terminal equipment. A clock signal which is generated from a clock generator 48 of a terminal equipment 42 is supplied to a clock switching part 49 where the period of this clock signal is switched. The transmission rate of the terminal equipment 42 is determined by this clock signal output from the clock switching part 49. In the terminal equipment 42, the clock switching part 49 is set to 1,000 bps, and thus, the transmission rate is set to 1,000 bps.

Similarly, in terminal equipment 43 which is provided with a clock generator 50 and a clock switching part 51, the transmission rate is set to 5,000 bps. In terminal equipment 44 which is provided with a clock generator 52 and a clock switching part 53, the transmission rate is set to 10,000 bps. As may be seen from FIG. 1, the transmission rates of the terminal equipment 42, 43 and 44 can be set independently to arbitrary values.

Serial interfaces 45, 46 and 47 of a host unit 41 are provided in correspondence with the terminal equipments 42, 43 and 44. During the initial setting of the terminal equipments 42, 43 and 44, the serial interfaces 45, 46 and 47 respectively set the transmission rates with respect to the terminal equipment 42, 43 and 44.

According to this method, however, the transmission rates are fixed by the initial setting. For this reason, it is impossible to switch the transmission rates during operation of the terminal equipments 42, 43 and 44.

There are cases where the transmission data includes a large amount of data, such as image data. In such cases, it takes time to transmit the data from the terminal equipment if the transmission rate is low, and the operation speed of the terminal equipment deteriorates. Hence, it is necessary in such cases to increase the transmission rate depending on the amount of data, so that the transmission data can be transmitted collectively.

On the other hand, if the amount of the transmitted data is too large and the host unit cannot carry out the data processing, it is necessary to reduce the amount of transmitted data by reducing the transmission rate of the terminal equipment, so that the host unit can carry out normal data processing.

Therefore, even in the case where the data processing efficiency would deteriorate if the transmission rate of the terminal equipment is not changed during operation, the transmission rate cannot be changed when it is fixed by the initial setting. For this reason, there is a demand to realize a method of changing the transmission rate of the serial interface depending on the needs.

On the other hand, FIG. 2 shows an example of another conventional method of switching the transmission rate. According to this method, a command for changing the transmission rate is provided within a terminal equipment control signal which is transmitted to a terminal equipment 32 via a serial interface controller 33, a transmission line 36 and a serial interface controller 34. FIG. 3 is a time chart for explaining this method.

In FIG. 3, the data transmission is normally made at 1,000 bps. When switching the transmission rate from the normal 1,000 bps to 5,000 bps, a transmission rate change request command is transmitted from a host unit 31 to the terminal equipment 32. The terminal equipment 32 recognizes the transmission rate change request command within the transmission data, and changes in a clock switching part (transmission rate switching part) 35 the period of the clock signal which determines the transmission rate. The clock signal having the changed period is input to the serial interface controller 34, and the serial interface controller 34 determines the transmission rate with reference to this clock signal.

The data communication between the host unit 31 and the terminal equipment 32 is started at 5,000 bps after an answer related to the completion of the transmission rate change is transmitted from the terminal equipment 32.

When making the data transmission at 1,000 bps again, a transmission rate change request command is transmitted from the host unit 31 to the terminal equipment 32. In this case, the terminal equipment 32 changes the period of the clock signal which is generated from an oscillator 37, similarly to the above described case where the transmission rate is changed to 5,000 bps, and switches the transmission rate to 1,000 bps.

According to this method, the transmission rate can be set high when transmitting a large amount of data, such as when transmitting the image data. On the other hand, the transmission rate can be set to a relatively low value when making the normal data transmission.

However, this conventional method described with reference to FIGS. 2 and 3 suffer from the following problems.

When a power failure occurs at terminal equipment 32, the terminal equipment 32 is reset to the initial setting. If the transmission rate is set to 1,000 bps by the initial setting, for example, the transmission rate of the terminal equipment 32 is returned to 1,000 bps regardless of the transmission rate used at the time when the power failure occurred.

On the other hand, the host unit 31 recognizes that the transmission rate of the terminal equipment 32 is set to 5,000 bps at the time when the transmission rate change command is generated from the terminal equipment 32. The host unit 31 does not have any means for confirming the data transmission rate after the data transmission. For this reason, if a fault such as a power failure occurs at the terminal equipment 32 and the transmission rate is returned to the initial 1,000 bps after the recovery, the host unit 31 still recognizes the transmission rate of the terminal equipment 32 as being set to 5,000 bps which was used at the time when the fault occurred, and the host unit 31 carries out a process to exchange data with the terminal equipment 32 at 5,000 bps.

Accordingly, the transmission rate recognized by the host unit 31 becomes different from the transmission rate which is actually set at the terminal equipment 32. As a result, a synchronization error is generated when exchanging the data, and a correct data transmission can no longer be made between the host unit 31 and the terminal equipment 32.

If the supply of power to the terminal equipment is made from the host unit, the transmission rate of the terminal equipment will not return to the initial value even when a power failure occurs, and the above described problems will not occur. Similarly, the above described problems will not occur if the equipment is provided with the necessary control functions for making the recovery.

However, not all terminal equipment can receive the supply of power from the host unit. In addition, because the control procedure for making the recovery is extremely complex, the construction of the equipment becomes complex and the equipment becomes expensive. Therefore, it is desirable that the above described problems can be eliminated even if the terminal equipment does not receive the supply of power from the host unit.

SUMMARY OF THE INVENTION

Accordingly, it is a general object of the present invention to provide a novel and useful transmission rate control system in which the problems described above are eliminated.

Another and more specific object of the present invention is to provide a transmission rate control system adapted for an information processing system which exchanges data between a host unit and at least one terminal via a first transmission line. The transmission rate control system comprises a first means, provided in the host unit, for generating a clock switching signal which instructs a switching of a first clock signal which determines an operation of the terminal equipment, second means, provided in the terminal equipment, for generating the first clock signal which determines the operation of the terminal equipment, third means, coupled to the second means and provided in the terminal equipment, for switching a period of the first clock signal generated from the second means in response to the clock switching signal received from the main unit, so that a transmission rate of the terminal equipment is switched, and a second transmission line provided exclusively for transmitting the clock switching signal from the host unit to the terminal equipment. According to the transmission rate control system of the present invention, it is possible to switch the transmission rate even during operation of the terminal equipment. For this reason, the data transmission rate can be changed depending on the amount of data and the like, so as to improve the data processing efficiency. Furthermore, even if a power failure occurs at the terminal equipment, the state of the clock switching signal which determines the transmission rate can be maintained. For this reason, it is possible to always realize a correct data transmission because the transmission rate recognized at the host unit is always the same as the actual transmission rate of the terminal equipment and no synchronizing error will occur.

Other objects and further features of the present invention will be apparent from the following detailed description when read in conjunction with the accompanying drawings.

DESCRIPTION OF THE PREFERRED EMBODIMENTS

Figure 1:
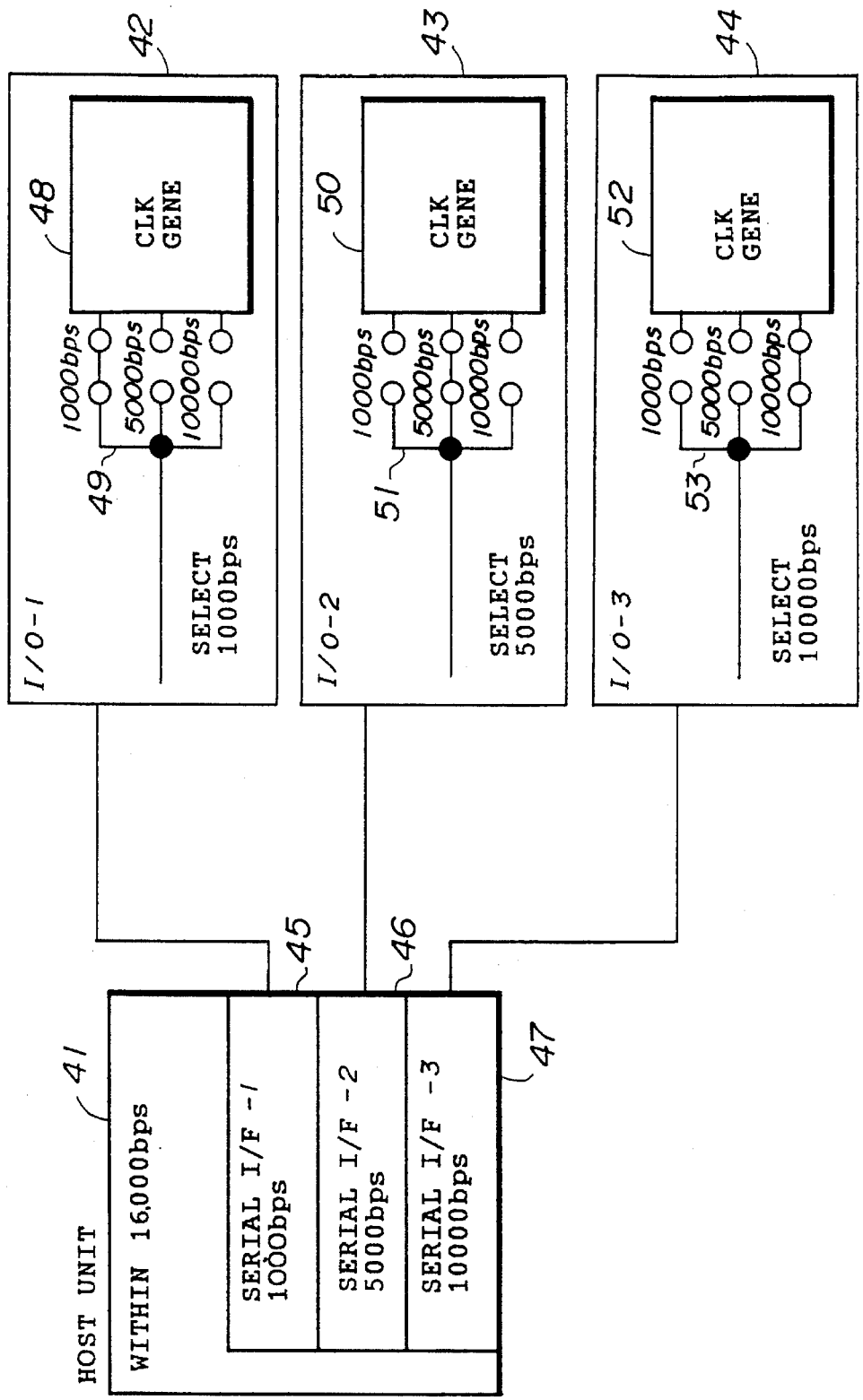
FIG. 1 is a system block diagram for explaining an example of a conventional method of switching the transmission rate.
Figure 2:
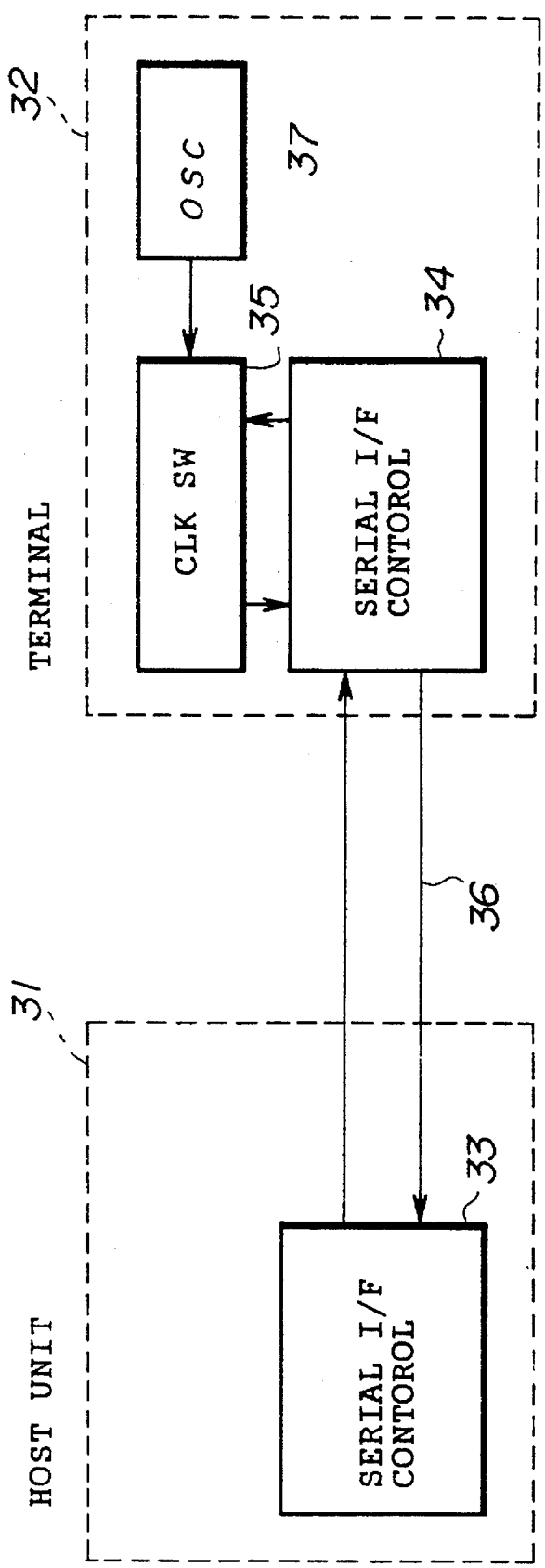
FIG. 2 is a system block diagram for explaining another example of a conventional method of switching the transmission rate.
Figure 3:
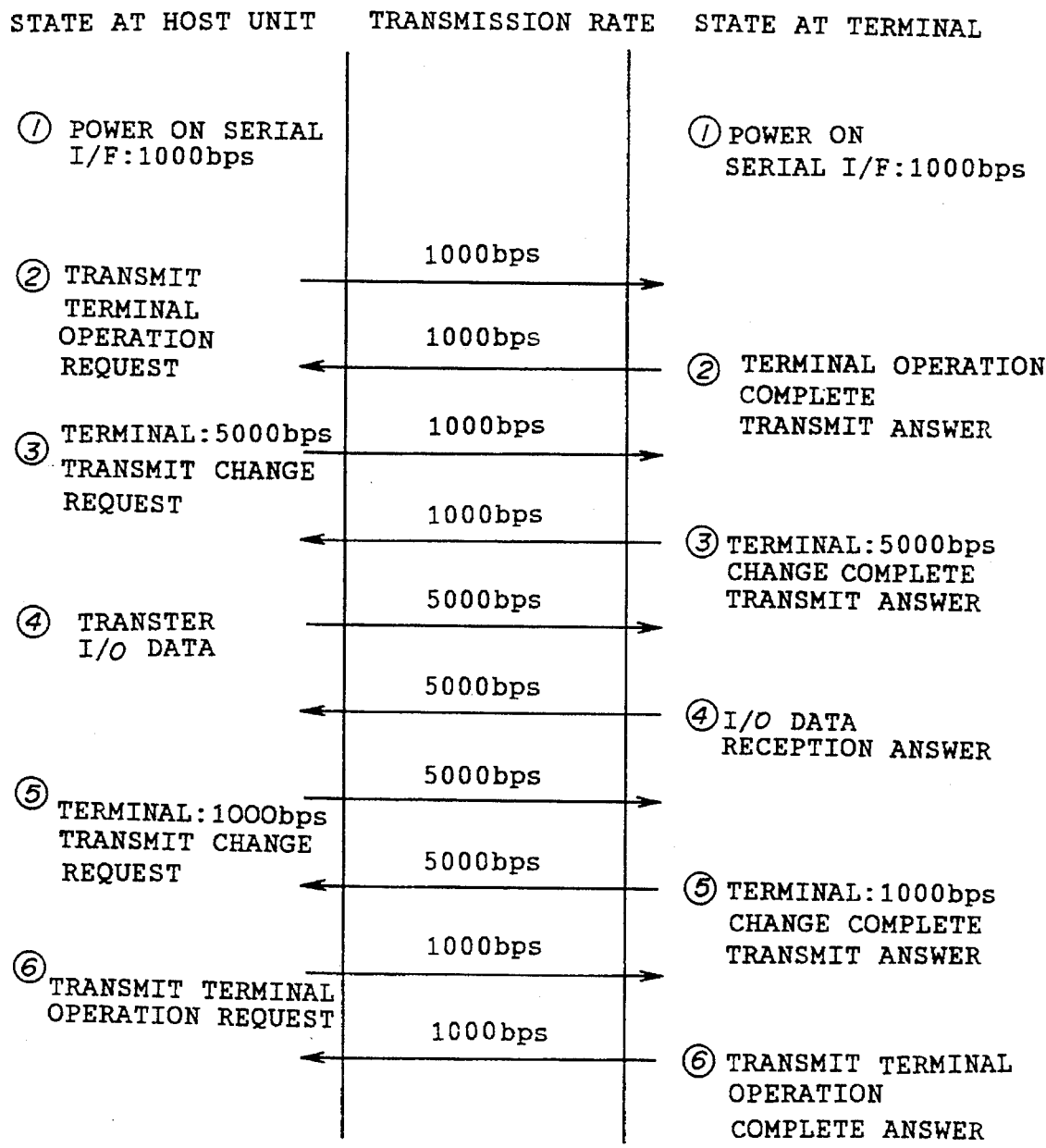
FIG. 3 is a time chart for explaining the operation of the block system shown in FIG. 2.
Figure 4:
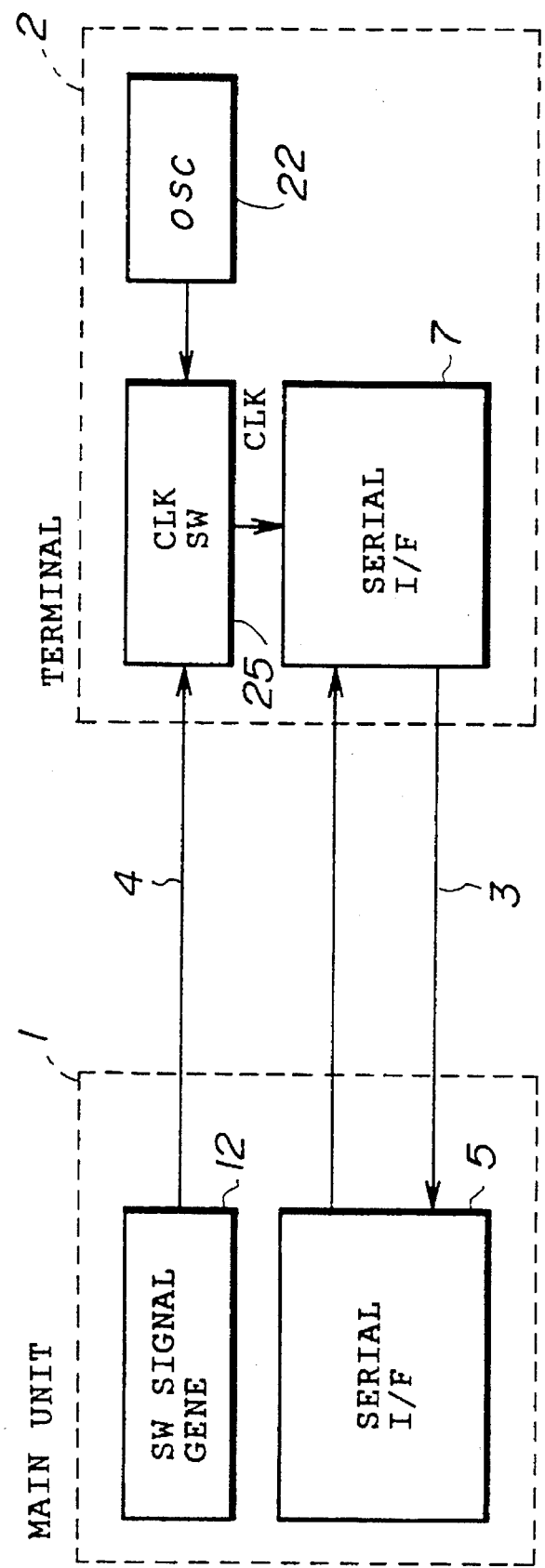
FIG. 4 is a system block diagram for explaining the operating principle of the present invention.

First, a description will be given of the operating principle of the present invention, by referring to FIG. 4. In FIG. 4, a host unit 1 includes a serial interface 5 and a switching signal generator 12. On the other hand, a terminal equipment 2 includes a serial interface 7, an oscillator 22 and a clock switching part 25.

The switching signal generator 12 generates a clock switching signal which instructs the switching of the clock signal which determines the operation of the terminal equipment 2. The oscillator 22 generates a clock signal which determines the operation of the terminal equipment 2. The clock switching part 25 switches the period of the clock signal which is generated from the oscillator 22 in response to the clock switching signal which is received from the host unit 1. The clock switching signal is transmitted from the host unit 1 to the terminal equipment 2 via a transmission line 4 when switching the transmission rate of the terminal equipment 2.

The serial interfaces 5 and 7 are coupled via a transmission line 3 which is independent from the transmission line 4.

According to the present invention, the clock switching part 25 is switched by the clock switching signal which is generated from the host unit 1, so as to switch the period of the clock signal which determines the operation of the terminal equipment 2. For this reason, the transmission rate of the terminal equipment 2 can be switched even during operation of the terminal equipment 2.

On the other hand, the clock switching signal is transmitted via the transmission line 4 which is provided exclusively therefor, and is not included in the control signals exchanged between the host unit 1 and the terminal equipment 2. For this reason, it is possible to always maintain the state of the transmission line 4 constant. In addition, the operation of the clock switching part 25 which determines the period of the clock signal is determined by the state of the clock switching signal.

As a result, even when a power failure occurs at the terminal equipment 2, the host unit 1 constantly continues to transmit the clock switching signal. Hence, even if a fault such as the power failure occurs at the terminal equipment 2, the transmission rate of the terminal equipment 2 can be set to the transmission rate which was used at the time when the fault occurred after the recovery is made. In this case, the host unit 1 does not need to recognize the state of the terminal equipment 2.

Accordingly, it is possible to prevent the transmission rate recognized by the host unit 1 from becoming different from the actual transmission rate set at the terminal equipment 2, and a correct data transmission is always guaranteed.

Figure 5:
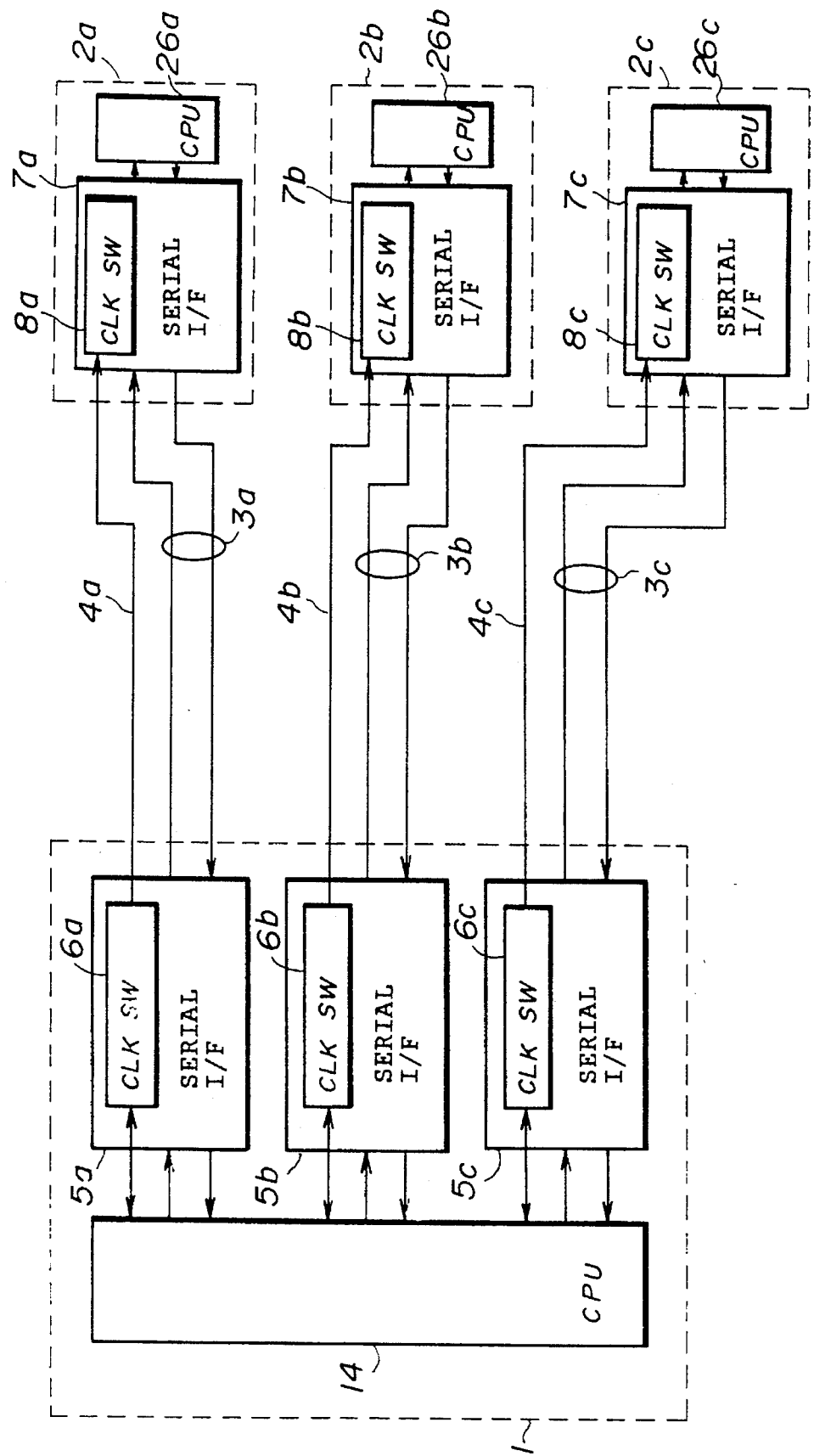
FIG. 5 is a system block diagram showing an embodiment of a transmission rate control system according to the present invention.
Figure 6:
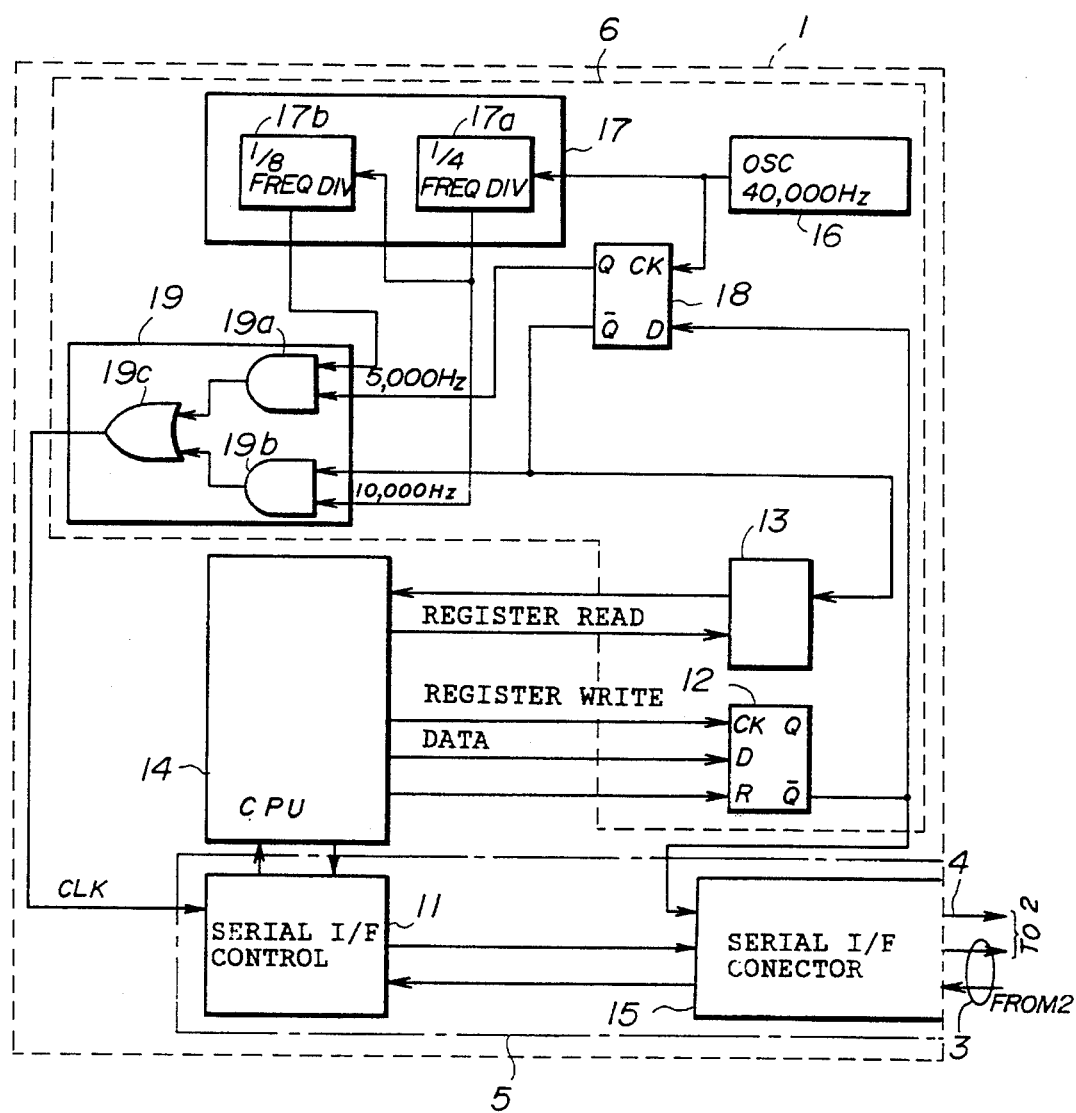
FIG. 6 is a system block diagram showing a host unit employed in the embodiment.
Figure 7:
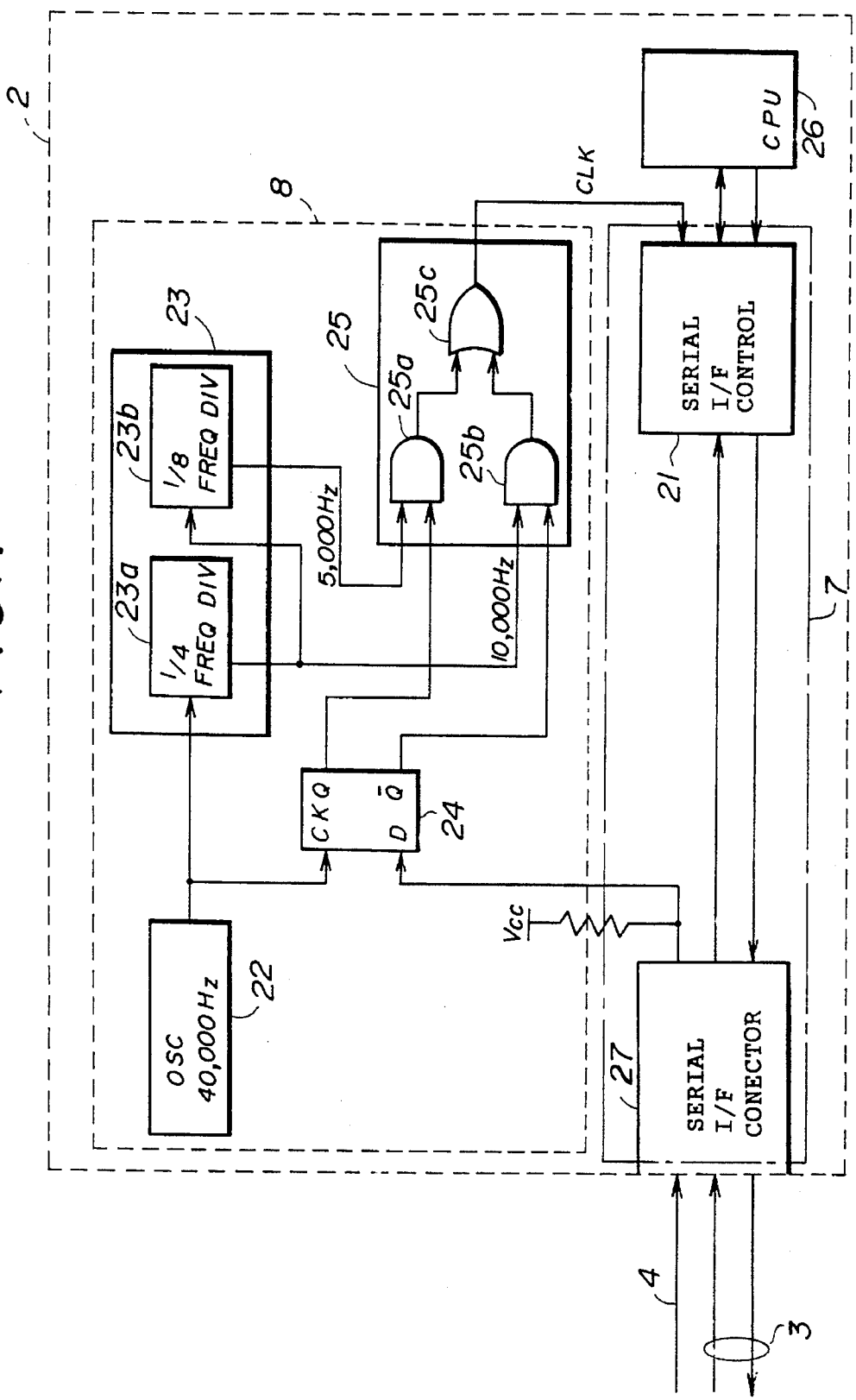
FIG. 7 is a system block diagram showing a terminal equipment which is employed in the embodiment.

Next, a description will be given of an embodiment of the transmission rate control system according to the present invention, by referring to FIGS. 5 through 7. FIG. 5 generally shows this embodiment. More particularly, FIG. 5 shows an information processing system to which this embodiment is applied. FIG. 6 shows a host unit in more detail, and FIG. 7 shows a terminal equipment in more detail.

In FIG. 5, a host unit 1 and terminal equipments 2a, 2b and 2c are coupled via transmission lines 3 and 4. The transmission lines 3a and 4a coupled 1 the host unit 1 and the terminal equipment 2a. The transmission lines 3b and 4b coupled the host unit 1 and the terminal equipment 2b. In addition, the transmission lines 3c and 4c coupled the host unit 1 and the terminal equipment 2c.

The host unit 1 includes a central processing unit (CPU) 14 and serial interface parts 5a, 5b and 5c. Each serial interface part 5i has a clock switching part 6i, where i=1, 2 and 3. Each serial interface part 5i is connected to the corresponding transmission lines 3i and 4i.

Each terminal equipment 2i includes a serial interface part 7i and a CPU 26i. Each serial interface part 7i includes a clock switching part 8i, and is connected to the corresponding transmission lines 3i and 4i.

As shown in FIG. 6, the host unit 1 includes a serial interface controller 11, registers 12 and 13, a CPU 14, a serial interface connector 15, an oscillator 16, a frequency dividing circuit 17, a synchronizing circuit 18, and a clock switching circuit 19 which are connected as shown. The serial interface controller 11 and the serial interface connector 15 correspond to the serial interface part 5 shown in FIG. 5. The registers 12 and 13, the oscillator 16, the frequency dividing circuit 17, the synchronizing circuit 18 and the clock switching circuit 19 correspond to the clock switching part 6 shown in FIG. 5.

As shown in FIG. 7, the terminal equipment 2 includes a serial interface controller 21, an oscillator 22, a frequency dividing circuit 23, a synchronizing circuit 24, a clock switching circuit 25, a CPU 26, and a serial interface connector 27 which are connected as shown. The serial interface controller 21 and the serial interface connector 27 correspond to the serial interface part 7 shown in FIG. 5. The oscillator 22, the frequency dividing circuit 23, the synchronizing circuit 24 and the clock switching circuit 25 correspond to the clock switching part 8 shown in FIG. 5.

In this embodiment, the plurality of terminal equipment 2a, 2b and 2c are connected with respect to the host unit 1. The serial interface parts 7a through 7c of the terminal equipment 2a through 2c are respectively connected to the serial interface parts 5a through 5c of the host unit 1. The exchange of data between the host unit 1 and the terminal equipments 2a through 2c is made via the respective transmission lines 3a through 3c.

The host unit 1 polls to the terminal equipments 2a through 2c, and each terminal equipment which is polled can exchange data with the host unit 1.

In this embodiment, it is assumed for the sake of convenience that the transmission rate can be set to one of two kinds, namely, 5,000 bps and 10,000 bps.

Normally, the transmission is made at the low speed of 5,000 bps. On the other hand, when transmitting a large amount of data such as image data, the transmission is made at the high speed of 10,000 bps so as to improve the data processing efficiency.

A description will now be given of a case where the transmission rate of the terminal equipment 2a is changed. The transmission rate of the other terminal equipments 2b and 2c can be changed similarly, and a description thereof will be omitted.

When switching the transmission rate of the terminal equipment 2a, the period of the clock signal which determines the operation of the terminal equipment 2a is changed. In order to change the period of the clock signal, the CPU 14 transmits data with respect to the register 12. The register 12 also receives a register write signal from the CPU 14, and transmits a clock switching signal to the terminal equipment 2a via the transmission line 4a which is used exclusively for transmitting the clock switching signal.

When the register 12 receives from the CPU 14 a register write signal which is "1", the register 12 outputs a signal "0" from an inverted output terminal $\overline{Q}$. On the other hand, the register 12 outputs a signal "1" from the inverted output terminal $\overline{Q}$ when a register write signal which is "0" is received from the CPU 14. The register 12 outputs the same value unless the value of the register write signal changes. The clock switching signal output from the register 12 is transmitted to the terminal equipment 2a.

The CPU 14 accesses to the register 13 and confirms the value stored therein. The CPU 14 generates a register read signal with respect to the register 13. The register 13 outputs the value of the present clock switching signal in response to the register read signal.

The output signal of the register 13 is input to the CPU 14. A clock terminal CK of the synchronizing circuit 18 receives a clock signal from the oscillator 16 having a frequency of 40,000 Hz. This synchronizing circuit 18 is made up of a flip-flop. An output signal of the synchronizing circuit 18 is synchronized to the clock signal from the oscillator 16.

The clock signal from the oscillator 16 is also supplied to the frequency dividing circuit 17 which is made up of a ¼ frequency divider 17a and a ⅛ frequency divider 17b. The 40,000 Hz clock signal input to the ¼ frequency divider 17a is converted into a 10,000 Hz signal. A part of the 10,000 Hz signal output from the ¼ frequency divider 17a is supplied to the ⅛ frequency divider 17b and is converted into a 5,000 Hz signal.

The 10,000 Hz signal and the 5,000 Hz signal output from the frequency dividing circuit 17 and the output signal of the synchronizing circuit 18 are supplied to the clock switching circuit 19. This clock switching circuit 19 is made up of gates 19a, 19b and 19c.

A signal from a output terminal Q of the synchronizing circuit 18 and the 5,000 Hz signal from the ⅛ frequency divider 17b are supplied to the AND gate 19a. On the other hand, a signal from an inverted output terminal $\overline{Q}$ of the synchronizing circuit 18 and the 10,000 Hz signal from the ¼ frequency divider 17a are supplied to the AND gate 19b. The signal from the inverted output terminal $\overline{Q}$ is also supplied to the register 13. Output signals of the AND gates 19a and 19b are supplied to the OR gate 19c. Hence, the output value of the OR gate 19c is determined by the output values of the AND gates 19a and 19b.

When changing the data transmission rate to 10,000 bps, the register write signal which is "1" is supplied to the register 12. As a result, a clock switching signal which is "0" is output from the inverted output terminal $\overline{Q}$ of the register 13. A clock switching signal which is "1" is output from the register 13 when the register write signal which is "0" is supplied to the register 13. Hence, the CPU 14 supplies the register write signal which is "1" or "0" depending on the transmission rate to be set with respect to the terminal equipment 2a.

If the clock switching signal is "0", the 10,000 Hz signal which is output from the ¼ frequency divider 17a is output from the OR gate 19c. On the other hand, the 5,000 Hz signal which is output from the ⅛ frequency divider 17b is output from the OR gate 19c if the clock switching signal is "1".

According to such a procedure, the operation of the host unit 1 is determined depending on the clock signal which is output from the clock switching circuit 19.

As described above, the clock switching signal output from the register 12 is supplied to the terminal equipment 2a via the serial interface connector 15, the transmission line 4a and the serial interface connector 27.

The oscillator 22 of the terminal equipment 2a generates a clock signal having a frequency of 40,000 Hz, and this clock signal is supplied to the frequency dividing circuit 23. The frequency dividing circuit 23 is made up of a ¼ frequency divider 23a and a ⅛ frequency divider 23b. The 40,000 Hz clock signal which is supplied to the ¼ frequency divider 23a is converted into a 10,000 Hz clock signal, and a part of this 10,000 Hz clock signal is supplied to the ⅛ frequency divider 23b. The ⅛ frequency divider 23b converts the clock signal from the ¼ frequency divider 23a into a 5,000 Hz clock signal.

Figure 8:
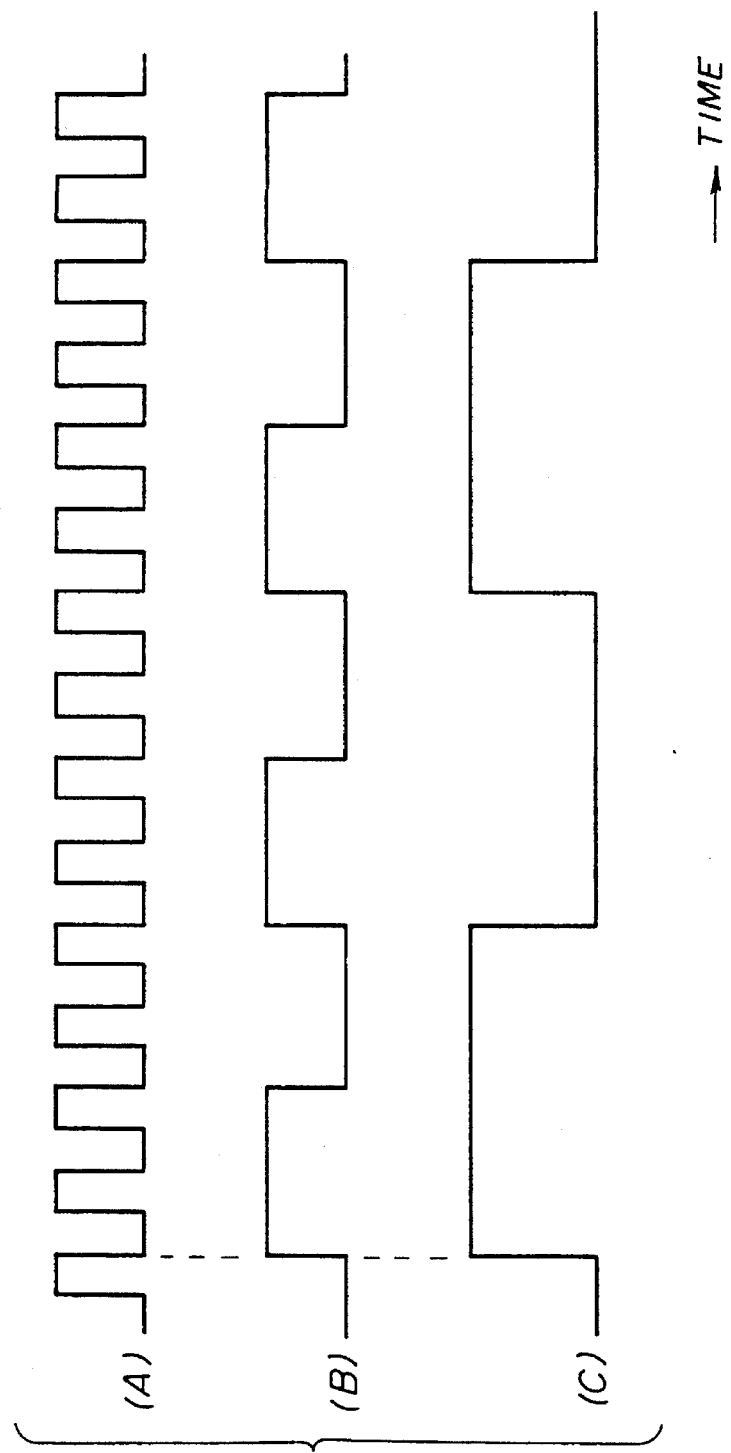
FIGS. 8 through 10 are time charts for explaining the operation of the embodiment.

FIG. 8(A) shows the waveform of the clock signal output from the oscillator 22, FIG. 8(B) shows the waveform of the clock signal output from the ¼ frequency divider 23a, and FIG. 8(C) shows the waveform of the clock signal output from the ⅛ frequency divider 23b.

The clock switching signal which is received via the serial interface connector 27 is supplied to the synchronizing circuit 24. This synchronizing circuit 24 is made up of a flip-flop. The synchronizing circuit 24 outputs the clock switching signal synchronously with the clock signal received from the oscillator 22 at a clock terminal CK.

The clock switching circuit 25 is made up of gates 25a, 25b and 25c. A signal from an output terminal Q of the synchronizing circuit 24 is supplied to the AND gate 25a which also receives the 5,000 Hz signal from the ⅛ frequency divider 23b. On the other hand, a signal from an inverted output terminal $\overline{Q}$ of the synchronizing circuit 24 is supplied to the AND gate 25b which also receives the 10,000 Hz clock signal from the ¼ frequency divider 23a. Output signals of the AND gates 25a and 25b are supplied to the OR gate 25c.

The transmission rate is set to 10,000 bps when the clock switching signal is "0" and is set to 5,000 bps when the clock switching signal is "1". Hence, when the clock switching signal is "0", a signal "0" is output from the output terminal Q of the synchronizing circuit 24, and a signal "1" is output from the inverted output terminal $\overline{Q}$ of the synchronizing circuit 24. Hence, the output signal of the AND gate 25a is "0", the output signal of the AND gate 25b is "1", and the OR gate 25c outputs the 10,000 Hz clock signal.

But if the clock switching signal is "1", a signal "1" is output from the output terminal Q of the synchronizing circuit 24, and a signal "0" is output from the inverted output terminal $\overline{Q}$ of the synchronizing circuit 24. Hence, the output signal of the AND gate 25a is "1", the output signal of the AND gate 25b is "0", and the OR gate 25c outputs the 5,000 Hz clock signal.

The output clock signal of the OR gate 25c, that is, the clock switching circuit 25, is supplied to the serial interface controller 21 as a transmission rate control clock signal.

Figure 9:
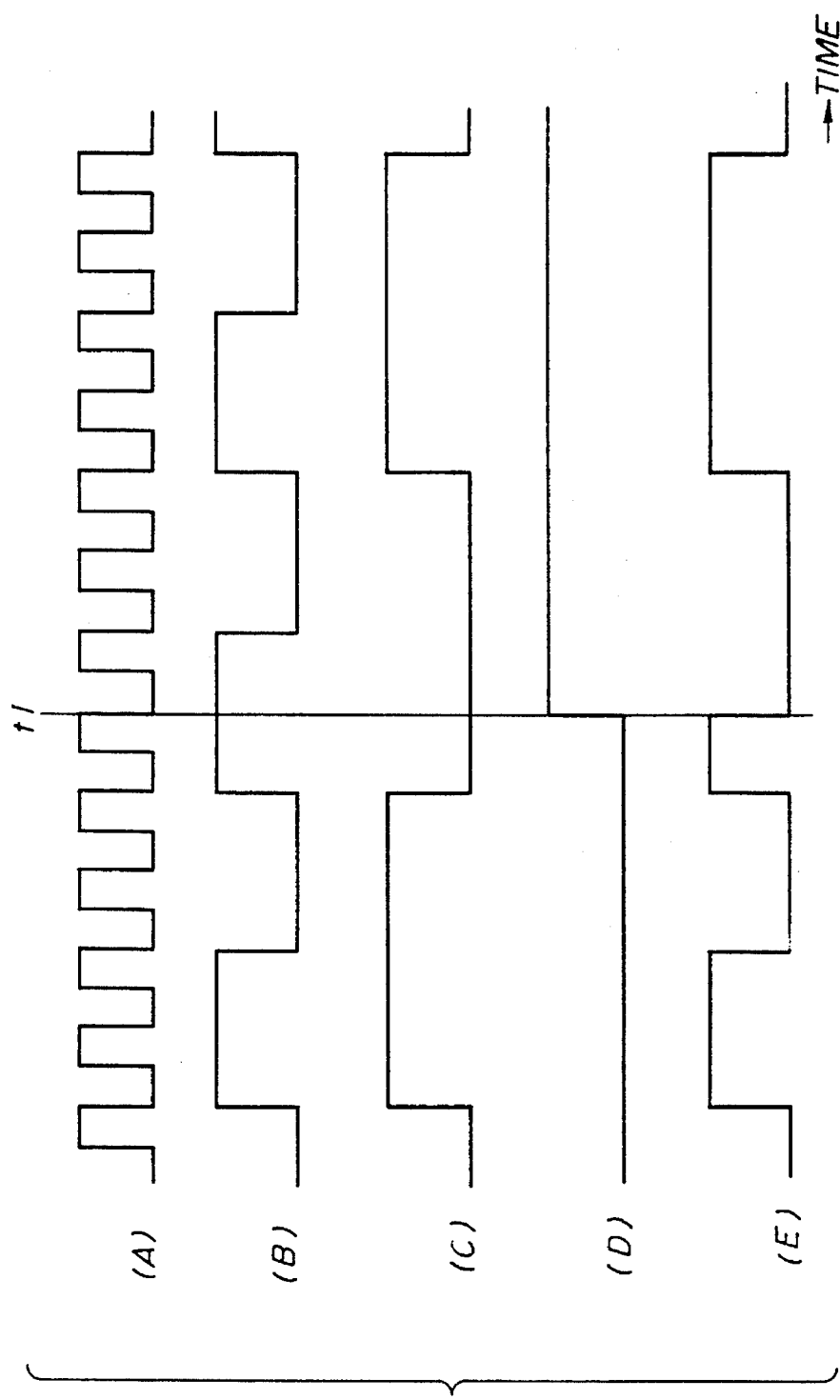

FIG. 9 shows the signal waveforms at various parts of the terminal equipment 2a when the transmission rate is changed from 10,000 bps to 5,000 bps. FIG. 9(A) shows the output clock signal of the oscillator 22, FIG. 9(B) shows the output signal of the ¼ frequency divider 23a, FIG. 9(C) shows the output signal of the ⅛ frequency divider 23b, FIG. 9(D) shows the clock switching signal received at the serial interface connector 27, and FIG. 9(E) shows the transmission rate control clock signal which is output from the clock switching circuit 25.

As may be seen from FIG. 9, the signals shown in FIG. 9(B), (C), (D) and (E) are synchronized to the 40,000 Hz clock signal which is output from the oscillator 22. In addition, as shown in FIG. 9(E), the transmission rate control clock signal has a frequency of 10,000 Hz at first. Then, the value of the clock switching signal shown in FIG. 9(D) changes from "0" to "1" at a time t1. The output signal of the OR gate 25c changes from the output of the AND gate 25b to the output of the AND gate 25a in response to this change of the clock switching signal at the time t1. As a result, the transmission rate control clock signal changes to the frequency of 5,000 Hz as shown in FIG. 9(E).

Figure 10:
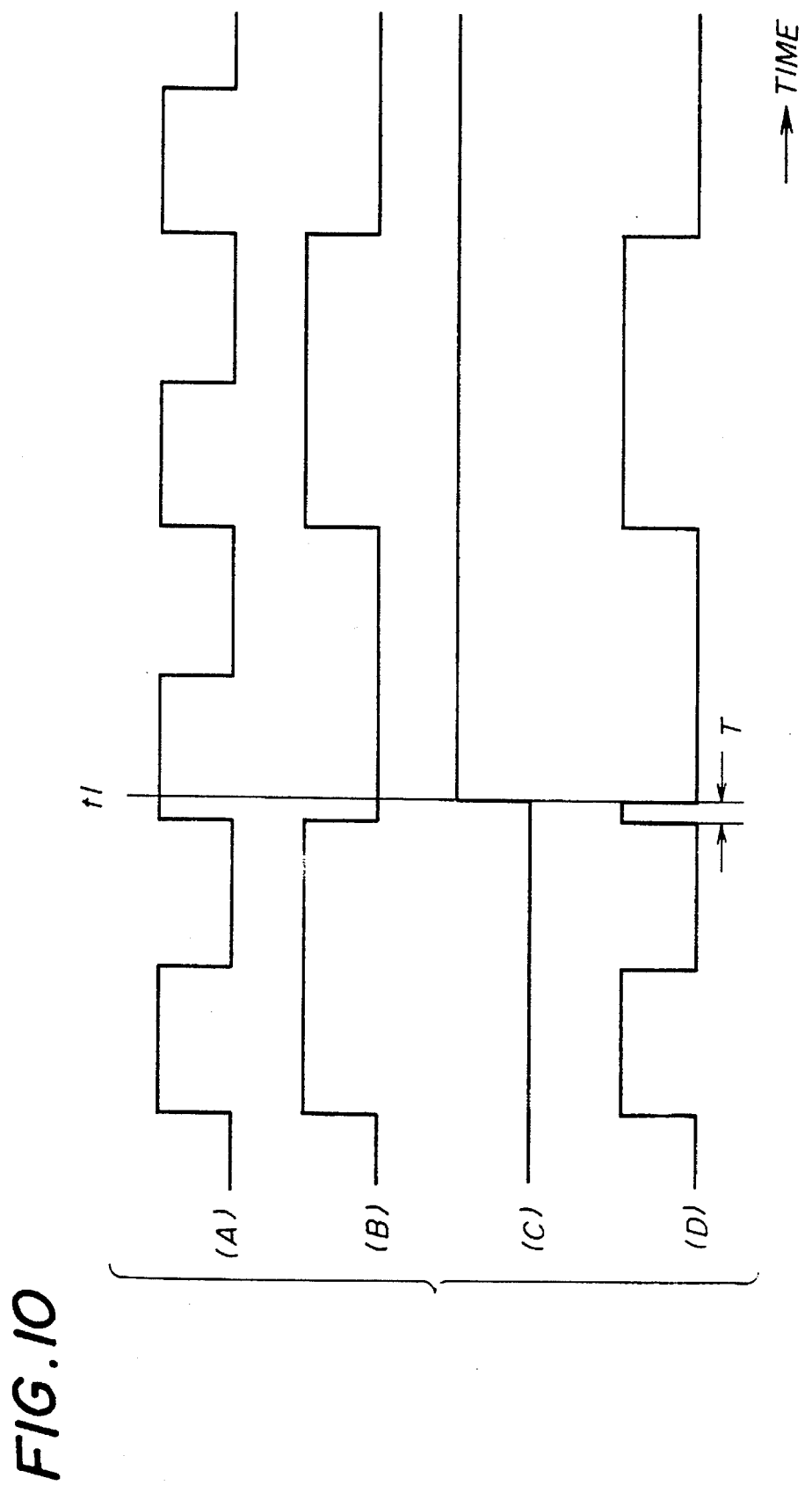

If the clock switching signal shown in FIG. 9(D) is not synchronized to the output clock signal of the oscillator 22 shown in FIG. 9(A) in the synchronizing circuit 24, the signal waveforms at the various parts of the terminal equipment 2a become as shown in FIG. 10. FIG. 10(A) shows the output signal of the ¼ frequency divider 23a, FIG. 10(B) shows the output signal of the ⅛ frequency divider 23b, FIG. 10(C) shows the clock switching signal received at the serial interface connector 27, and FIG. 10(D) shows the transmission rate control clock signal which is output from the clock switching circuit 25.

When the clock switching signal shown in FIG. 10(C) is received at the terminal equipment 2a at the time t1, the transmission rate control clock signal shown in FIG. 10(E) changes from 10,000 Hz to 5,000 Hz from this time t1. However, depending on the input timing of the clock switching signal shown in FIG. 10(C), a time interval T shown in FIG. 10(D) may become short. If the time interval T is short, the possibility of the terminal equipment 2a carrying out an erroneous operation is high, and a correct operation of the terminal equipment 2a cannot be guaranteed.

For this reason, in order to guarantee the width amounting to one cycle of the 40,000 Hz clock signal output from the oscillator 22, the clock switching signal is synchronized to the output clock signal of the oscillator 22 at the part where the clock period changes.

Returning to FIG. 9, the transmission rate control clock signal shown in FIG. 9(E) is supplied to the serial interface controller 27 from the clock switching circuit 25. Hence, the control of the serial interface, including the control of the data transmission, is determined by the transmission rate control clock signal.

Therefore, by the above described procedure, it is possible to switch the period of the clock signal which determines the operation of the terminal equipment 2a even during operation.

In this embodiment, the serial interface parts 5a through 5c and the clock switching parts 6a through 6c are provided in correspondence with the terminal equipments 2a, 2b and 2c. For this reason, the setting of the transmission rate can be made independently for each of the terminal equipments 2a through 2c.

If the transmission rates of the terminal equipments 2a through 2c are all 10,000 bps and the amount of data is large such that the processing speed of the host unit 1 is insufficient, it is possible to change the transmission rates of the terminal equipments 2a and 2b to 5,000 bps. The transmission rate of the terminal equipment 2a can be changed back to 10,000 bps and the transmission rate of the terminal equipment 2b may be kept to 5,000 bps. In other words, the transmission rates of the terminal equipments 2a through 2c may be changed depending on the processing state of the host unit 1.

In this embodiment, the periods of the clock signals which respectively determine the transmission rates of the host unit and the terminal equipment are both changed using the same clock switching signal. In addition, the value of the clock switching signal can always be maintained constant. Therefore, no synchronizing error will occur even when the transmission rate is switched and when the recovery of the terminal equipment is made after a failure, because the transmission rate recognized at the host unit will always be the same as the actual transmission rate of the terminal equipment.

Figure 11:
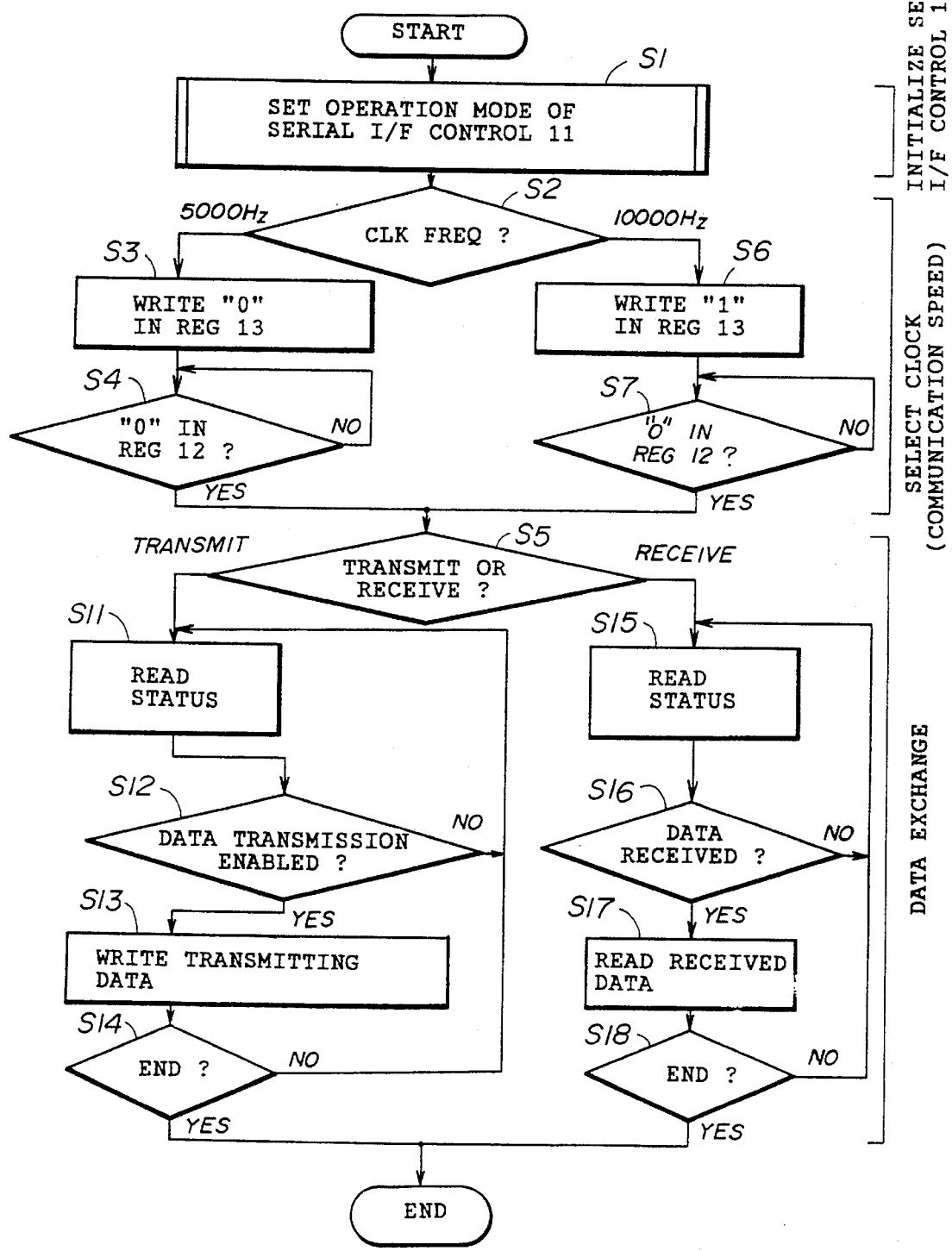
FIG. 11 is a flow chart for explaining the operation of the host unit shown in FIG. 6.

FIG. 11 shows an embodiment of the operation of the CPU 14 of the host unit 1 shown in FIG. 6. In FIG. 11, a step S1 sets the operation mode of the serial interface controller 11, and a step decides whether the clock signal having the frequency of 5,000 Hz or 10,000 Hz is to be selected. If the 5,000 Hz clock signal is selected, a step S3 writes a signal "0" in the register 13, and a step S4 decides whether or not a signal "0" is written in the register 12. The process advances to a step S5 when the decision result in the step S4 becomes YES.

On the other hand, if the 10,000 Hz clock signal is selected, a step S6 writes a signal "1" in the register 13, and a step S7 decides whether or not a signal "1" is written in the register 12. The process advances to the step S5 when the decision result in the step S7 becomes YES.

The step S5 decides whether or not the host unit 1 is in the transmitting mode or the receiving mode. If in the transmitting mode, a step S11 reads a transmission enable status within the serial interface controller 11, and a step S12 decides whether or not a data transmission is enabled. If the decision result in the step S12 is YES, a step S13 writes the transmitting data into the serial interface controller 11, and a step S14 decides whether or not the transmission of all of the data is completed. The process ends if the decision result in the step S14 is YES. The process returns to the step S11 if the decision result in the step S12 or S14 is NO.

On the other hand, if the host unit 1 is in the receiving mode, a step S15 reads a reception enable status within the serial interface controller 11, and a step S16 decides whether or not data is received. If the decision result in the step S16 is YES, a step S17 reads the received data from the serial interface controller 11, and a step S18 decides whether or not the reception of all of the data is completed. The process ends if the decision result in the step S18 is YES. The process returns to the step S15 if the decision result in the step S16 or S18 is NO.

Figure 12:
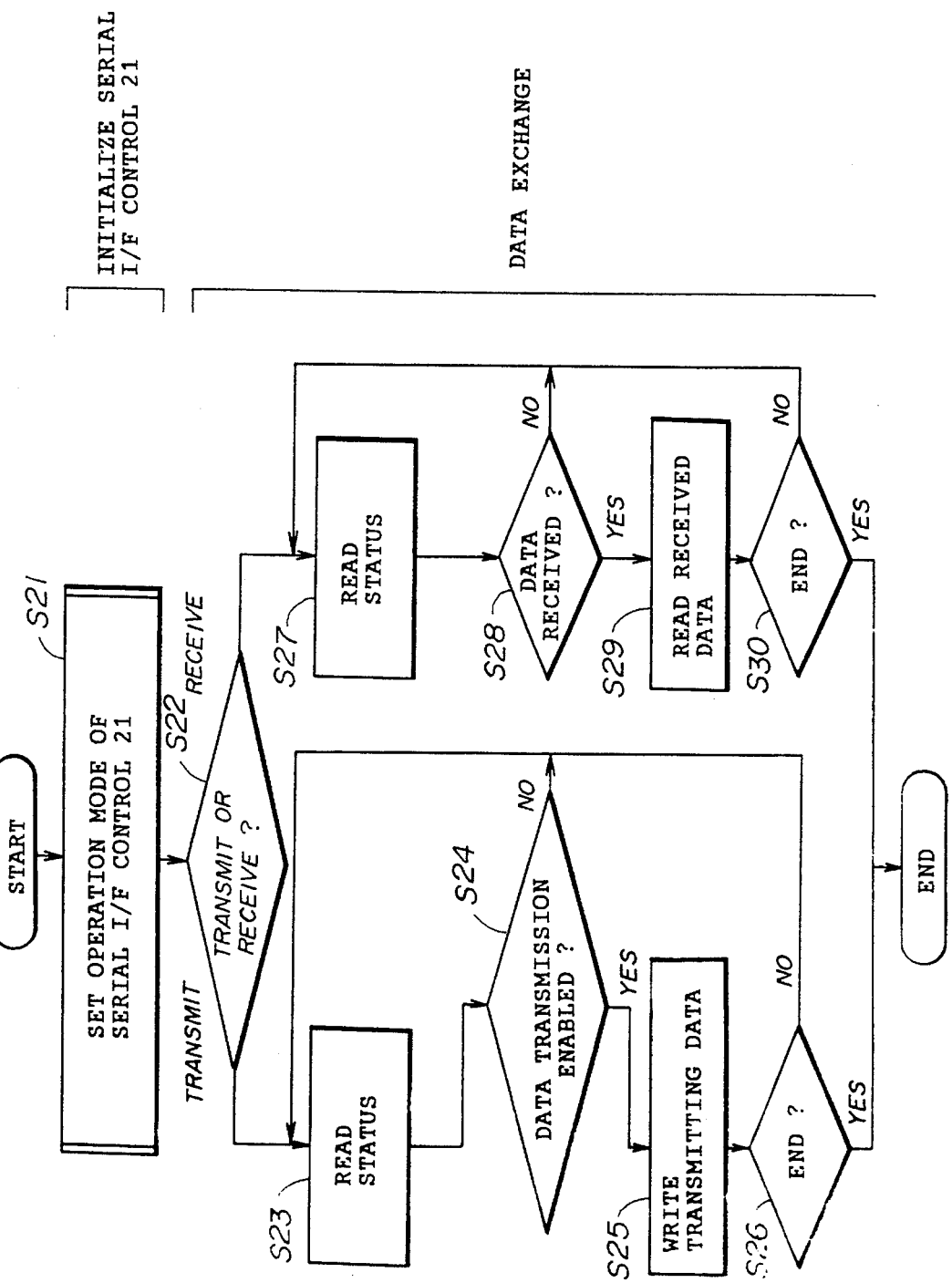
FIG. 12 is a flow chart for explaining the operation of the terminal equipment shown in FIG. 7.

FIG. 12 shows an embodiment of the operation of the CPU 26 of the terminal equipment 2 shown in FIG. 7. In FIG. 12, a step S21 sets the operation mode of the serial interface controller 21, and a step S22 decides whether the terminal equipment 2 is in the transmitting mode or the receiving mode. If in the transmitting mode, a step S23 reads a transmission enable status within the serial interface controller 21, and a step S24 decides whether or not a data transmission is enabled. If the decision result in the step S24 is YES, a step S25 writes the transmitting data into the serial interface controller 21, and a step S26 decides whether or not the transmission of all of the data is completed. The process ends if the decision result in the step S26 is YES. The process returns to the step S23 if the decision result in the step S24 or S26 is NO.

On the other hand, if the terminal equipment 2 is in the receiving mode, a step S27 reads a reception enable status within the serial interface controller 21, and a step S28 decides whether or not data is received. If the decision result in the step S28 is YES, a step S29 reads the received data from the serial interface controller 21, and a step S30 decides whether or not the reception of all of the data is completed. The process ends if the decision result in the step S30 is YES. The process returns to the step S15 if the decision result in the step S28 or S30 is NO.

In the described embodiment, the terminal equipment may take the form of various kinds of input/output units. For example, the terminal equipment may be selected from a group consisting of a keyboard, a printer, a card reader, an optical character reader, a bar code reader, an X-Y plotter and a modem interface. Of course, the terminal equipments coupled to the host unit may be mutually different kinds of input/output units.

Moreover, in the described embodiment, a communication control LSI uPD8251AFC manufactured by Nippon Electric Company of Japan may be used as the serial interface controller (11, 21).

Further, the present invention is not limited to these embodiments, but various variations and modifications may be made without departing from the scope of the present invention.

What is claimed is:

1. A transmission rate control system adapted for an information processing system which exchanges data between a host unit and a terminal equipment via a first transmission line, said transmission rate control system comprising:

first means, provided in the host unit, for generating a clock switching signal which instructs a switching of a first clock signal which determines an operation of the terminal equipment;

second means, provided in the terminal equipment, for generating the first clock signal which determines the operation of the terminal equipment;

third means, coupled to said second means and provided in the terminal equipment, for switching a period of the first clock signal generated from said second means in response to the clock switching signal received from the host unit, to switch a transmission rate of the terminal equipment; and a second transmission line which exclusively transmits the clock switching signal from the host unit to the terminal equipment independently of said first transmission line, wherein:

said clock switching signal has a state which is maintained depending on said transmission rate; and said transmission rate is judged at the terminal equipment based on the state of said clock switching signal.

2. The transmission rate control system as claimed in claim 1, wherein the host unit further comprises a first serial interface, the terminal equipment further comprises a second serial interface, and the first transmission line couples the host unit and the terminal equipment together via the first and second serial interfaces.

3. The transmission rate control system as claimed in claim 1, further comprising:

fourth means, provided in the host unit, for generating a second clock signal which determines the operation of the host unit; and fifth means, coupled to said fourth means and provided in the host unit, for switching a period of the second clock signal, generated from said fourth means, in response to the clock switching signal.

4. The transmission rate control system as claimed in claim 3, wherein said fourth means further comprises an oscillator generating the second clock signal and means for synchronizing the clock switching signal to the second clock signal generated from the oscillator.

5. The transmission rate control system as claimed in claim 1, wherein said second means further comprises an oscillator for generating the first clock signal, and said third means further comprises a synchronizing circuit for synchronizing the clock switching signal to the first clock signal generated from the oscillator.

6. The transmission rate control system as claimed in claim 1, wherein said third means further comprises a circuit for switching the transmission rate of the terminal equipment.

7. The transmission rate control system as claimed in claim 6, wherein the circuit of said third means, further, switches the transmission rate during operation of the terminal equipment.

8. The transmission rate control system as claimed in claim 1, wherein said third means, further, switches the period of the first clock signal during operation of the terminal equipment.

9. The transmission rate control system as claimed in claim 1, wherein said first means, further, maintains a state of the clock switching signal independently of a fault generated at the terminal equipment.

10. The transmission rate control system as claimed in claim 9, wherein said first means, further, maintains the state of the clock switching signal independently of a power failure at the terminal equipment.

11. The transmission rate control system as claimed in claim 1, wherein the terminal equipment comprises one of a keyboard, a printer, a card reader, an optical character reader, a bar code reader, an X-Y plotter and a modem interface.

12. The transmission rate control system as claimed in claim 1, further comprising a plurality of terminal equipments, each of the terminal equipments being coupled to the host unit and the plurality of terminal equipments being of respective, mutually different type.

13. The transmission rate control system adapted for an information processing system as recited in claim 1, wherein the second transmission line exclusively transmits the clock switching signal from the host unit to the terminal equipment, such that said transmission rate may be switched during operation of the terminal equipment.

14. The transmission rate control system adapted for an information processing system as recited in claim 1, further comprising a plurality of terminal equipments, each of the plurality of terminal equipments being coupled to the host unit via a respective first transmission line, and wherein:

the host unit further comprises respective first means, each respective first means generating a respective clock signal for a respective terminal equipment, the respective clock signal instructing a respective switching of a respective first clock signal which determines a respective operation of the respective terminal equipment of the plurality of terminal equipments;

each of the terminal equipments further comprises a respective second means for generating the respective first clock signal which determines the respective operation of the respective terminal equipment;

each of the plurality of terminal equipments further comprises a respective third means coupled to said respective second means, for switching a respective period of the respective first clock signal, generated from said respective second means, in response to the respective clock switching signal received from the host unit thereby to switch a respective transmission rate of the respective terminal equipment; and each of the plurality of terminal equipments is coupled to the host unit by a respective second transmission line, each second transmission line exclusively transmitting the respective clock switching signal from the host unit to the respective terminal equipment.

15. The transmission rate control system as claimed in claim 14, wherein the host unit further comprises a first serial interface, each of the plurality of terminal equipments further comprises a second serial interface, and each respective first transmission line couples the host unit and the respective terminal equipment via the respective first and second serial interfaces.

16. The transmission rate control system as claimed in claim 14, further comprising:

fourth means, provided in the host unit, for generating a second clock signal which determines the operation of the host unit; and fifth means, coupled to said fourth means and provided in the host unit, for switching a period of the second clock signal, generated from said fourth means, in response to the clock switching signal.

17. The transmission rate control system as claimed in claim 16, wherein said fourth means further comprises an oscillator generating the second clock signal and means for synchronizing the clock switching signal to the second clock signal generated from the oscillator.

18. The transmission rate control system as claimed in claim 14, wherein each of said respective second means further comprises a respective oscillator for generating the respective first clock signal, and each of said respective third means includes a synchronizing circuit for synchronizing the respective clock switching signal to the respective first clock signal generated from the respective oscillator.

19. The transmission rate control system as claimed in claim 14, wherein each of said respective third means further comprises a circuit for switching the respective transmission rate of the respective terminal equipment.

20. The transmission rate control system as claimed in claim 19, wherein each respective circuit of each of said respective third means, further, switches the respective transmission rate during operation of the respective terminal equipment.

21. The transmission rate control system as claimed in claim 14, wherein each of said respective third means, further, switches the respective period of the respective first clock signal during operation of the respective terminal equipment.

22. The transmission rate control system as claimed in claim 14, wherein each of said respective first means, further, maintains a respective state of the respective clock switching signal independently of a respective fault generated at the respective terminal equipment.

23. The transmission rate control system as claimed in claim 22, wherein each of said first means, further, maintains the respective state of the clock switching signal independently of a power failure at the respective terminal equipment.

24. The transmission rate control system as claimed in claim 14, wherein each terminal equipment, of the plurality of terminal equipments, is one of a keyboard, a printer, a card reader, an optical character reader, a bar code reader, an X-Y plotter and a modem interface.

\* \* \* \* \*

UNITED STATES PATENT AND TRADEMARK OFFICE
CERTIFICATE OF CORRECTION

PATENT NO. : 5,586,151
DATED : Dec. 17, 1996
INVENTOR(S) : MINAGAWA

It is certified that error appears in the above-indentified patent and that said Letters Patent is hereby corrected as shown below:

Col. 5, line 46, change "coupled 1 the" to --coupled the--.

Col. 6, line 23, change "polls to the terminal equipments" to --polls the terminal equipment--;
line 59, change "accesses to the" to --accesses the--.

Signed and Sealed this

Twenty-fifth Day of March, 1997

Attest:

BRUCE LEHMAN

Attesting Officer      Commissioner of Patents and Trademarks